(12) United States Patent
Dieckmann et al.

(10) Patent No.: US 10,306,698 B2
(45) Date of Patent: May 28, 2019

(54) METHOD FOR SETTING UP AND OPERATING A WIRELESS NETWORK

(71) Applicant: WABCO GmbH, Hannover (DE)

(72) Inventors: Thomas Dieckmann, Pattensen (DE); Andelko Glavinic, Sarstedt (DE); Frank Höwing, Wolfenbüttel (DE); Sebastian Kühne, Sarstedt (DE); Ulf Laude, Hambühren (DE); Thomas Wolf, Barsinghausen (DE)

(73) Assignee: WABCO GmbH, Hannover (DE)

( * ) Notice: Subject to any disclaimer, the term of this patent is extended or adjusted under 35 U.S.C. 154(b) by 140 days.

(21) Appl. No.: 15/320,426

(22) PCT Filed: May 22, 2015

(86) PCT No.: PCT/EP2015/001045
§ 371 (c)(1),
(2) Date: Dec. 20, 2016

(87) PCT Pub. No.: WO2015/192936
PCT Pub. Date: Dec. 23, 2015

(65) Prior Publication Data
US 2017/0142600 A1  May 18, 2017
US 2017/0359736 A9  Dec. 14, 2017

(30) Foreign Application Priority Data

Jun. 20, 2014 (DE) .......................... 10 2014 009 242

(51) Int. Cl.
*H04L 12/28* (2006.01)
*H04W 76/20* (2018.01)
(Continued)

(52) U.S. Cl.
CPC ............. *H04W 76/20* (2018.02); *H04L 67/12* (2013.01); *H04L 67/34* (2013.01);
(Continued)

(58) Field of Classification Search
CPC ............................ H04W 72/048; H04L 67/12
See application file for complete search history.

(56) References Cited

U.S. PATENT DOCUMENTS 9,262,460 B2 *  2/2016  Hanke ............... G06F 17/30725
2004/0179512 A1  9/2004  Leblanc et al.
(Continued)

FOREIGN PATENT DOCUMENTS

DE  102011008403 A1  9/2011
DE  102011080303 A1  2/2012
(Continued)

*Primary Examiner* — Chi H Pham
*Assistant Examiner* — Fahmida S Chowdhury
(74) *Attorney, Agent, or Firm* — Warner Norcross & Judd LLP

(57) ABSTRACT

A method is disclosed for establishing and operating a wireless network with a first communication unit, a second communication unit and a mobile communication unit. The first and second communication units are configured in each case as a server and the mobile communication unit is configured as a client. The mobile communication unit acquires connection set-up data of the first and second communication units. A wireless connection is established from the mobile communication unit to the first communication unit. The latter receives an instruction from the mobile communication unit via the wireless connection for configuration as a client of the second communication unit and the mobile communication unit transfers the connection set-up data of the second communication unit to the first communication unit. A wireless connection is then established from the mobile communication unit to the second communication unit.

18 Claims, 3 Drawing Sheets

(51) Int. Cl.
*H04W 24/02* (2009.01)
*H04W 76/14* (2018.01)
*H04L 29/08* (2006.01)
*H04M 1/737* (2006.01)
*H04W 72/04* (2009.01)
*H04M 1/725* (2006.01)
*H04W 84/18* (2009.01)

(52) U.S. Cl.
CPC ......... *H04M 1/7253* (2013.01); *H04M 1/737* (2013.01); *H04W 24/02* (2013.01); *H04W 72/048* (2013.01); *H04W 76/14* (2018.02); *H04W 84/18* (2013.01)

(56) References Cited

U.S. PATENT DOCUMENTS

| | | |
|---|---|---|
| 2010/0241857 A1 | 9/2010 | Okude et al. |
| 2012/0030465 A1 | 2/2012 | Bailey |
| 2012/0039248 A1* | 2/2012 | Schneider ........... H04W 84/005 370/328 |
| 2014/0068104 A1* | 3/2014 | Armstrong ............. H04L 45/24 709/238 |
| 2014/0128049 A1* | 5/2014 | Aoki ...................... B60K 37/02 455/418 |
| 2015/0051787 A1* | 2/2015 | Doughty ................ G07C 5/008 701/31.5 |
| 2015/0062017 A1* | 3/2015 | Barabas ............... H04M 1/6091 345/169 |
| 2015/0120083 A1* | 4/2015 | Gurovich ............... G07C 5/008 701/1 |
| 2015/0339334 A1* | 11/2015 | Hanke ............... G06F 17/30725 707/736 |
| 2017/0316621 A1* | 11/2017 | Jefferies ............... G07C 5/0808 |

FOREIGN PATENT DOCUMENTS

| | | |
|---|---|---|
| DE | 102012012565 A1 | 12/2013 |
| WO | WO2005011182 A2 | 2/2005 |
| WO | WO2012037666 A1 | 3/2012 |

* cited by examiner

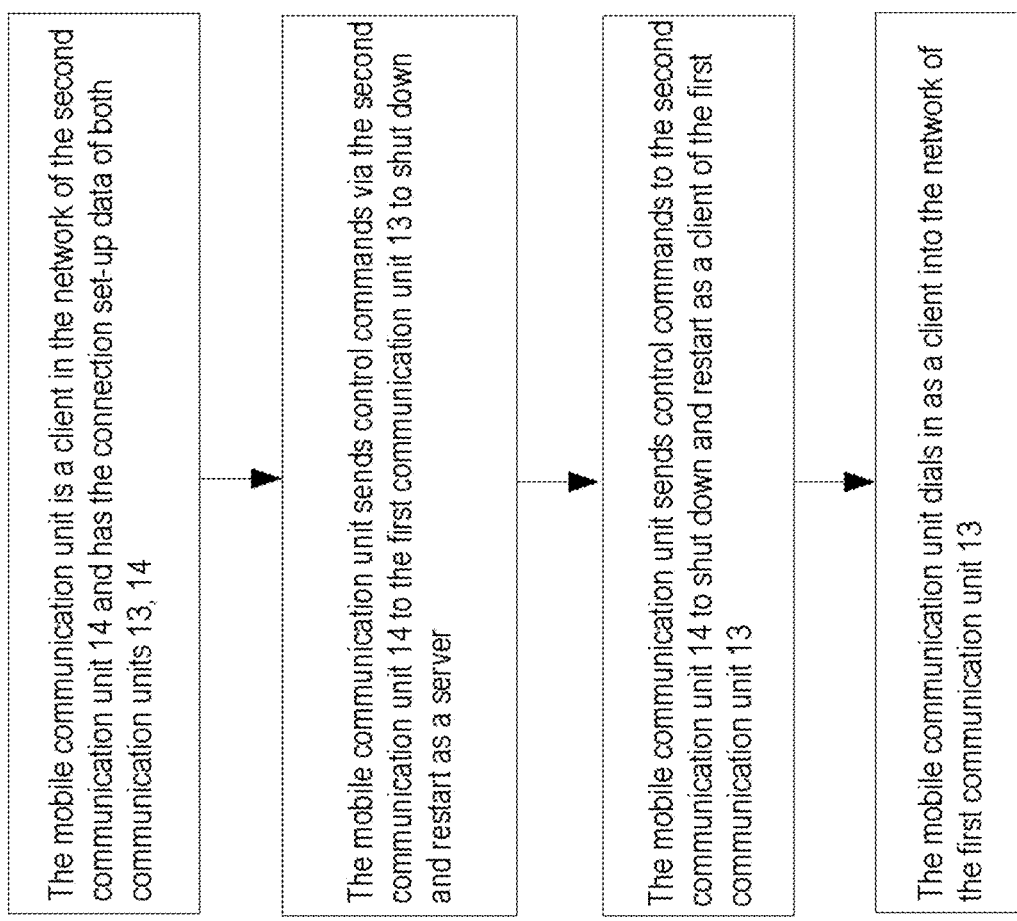

METHOD FOR SETTING UP AND OPERATING A WIRELESS NETWORK

CROSS-REFERENCE TO RELATED APPLICATIONS

This application is the National Stage of International Application No. PCT/EP2015/001045, filed on 22 May 2015, which claims priority to and all advantages of German Patent Application No. 10 2014 009 242.9, filed on 20 Jun. 2014, the content of which is hereby incorporated by reference.

FIELD OF THE INVENTION

The invention generally relates to a method for establishing a network and, more specifically, to a method of establishing and operating a wireless network with a mobile communications unit and a related system.

BACKGROUND OF THE INVENTION

During the operation of a commercial vehicle, data are produced which are made available to a driver in his driver's cab on display instruments or other output devices. For example, the driver of a truck with pneumatic suspension and an electronic braking system receives not only data relating to the vehicle speed and engine speed, but also information relating to the system pressure (pressure in the braking system), the axle load (via bellows pressure sensors), the distance to rearward obstacles (via proximity sensors), etc. The data are transferred in part directly to the display instruments in the driver's cab, and in part via an on-board data bus system, such as a CAN bus system.

In a road train, consisting of a plurality of vehicle units, i.e. a traction unit and one or more trailer vehicles, data of the trailer vehicles can be forwarded via standardized interfaces to the traction vehicle, e.g. via the CAN bus system, a powerline adapter or otherwise. This requires a corresponding technical equipment of the traction unit and the trailer vehicles. The data are typically collected in an electronic control unit and are made available to the data bus system. The control unit must have a corresponding interface for the data bus system. The CAN data bus system, widespread throughout Europe, only allows the forwarding of specified data. Special data which are produced only in a specific vehicle type and are not yet specified for the CAN data bus are not transmitted and are therefore not readable for the driver in his driver's cab. An additional communication path between the driver and the relevant vehicle units is required.

Commercial vehicles are often intended to perform actions and/or to make information available to the driver or a different operating person even after they have been switched off. The operating person is typically located outside the vehicle. A communication facility is appropriate here without the operating person having to be located in the driver's cab for this purpose.

Mobile communication devices such as Smartphones, tablet PCs and other mini-computers with the capability to establish and use a wireless connection for communication, for example WLAN (Wireless Local Area Network) also, are now widespread. With a corresponding technical equipment of the vehicle, the operating person could establish a connection to the vehicle with the Smartphone and obtain information or perform functions in the vehicle. A wireless connection must be established in advance between the Smartphone and the vehicle, wherein it should be ensured that only authorized operating persons can establish a connection. If functions of the vehicle are to be performed, it is appropriate if only one operating person has access to the vehicle. Conflicting function calls may otherwise be made.

It is generally known to connect a Smartphone to a communication unit of a vehicle via WLAN. To establish and authenticate the WLAN connection, the data required for this purpose (network name, network key, password) are transmitted via a USB cable, NFC or as a QR code from the communication unit of the vehicle to the Smartphone. The operating person no longer has to type the data into the Smartphone. The abbreviations used above (WLAN, USB, NFC, QR code, Bluetooth) and others are understood in the art.

SUMMARY OF THE INVENTION

One object of the present invention is to produce a method for establishing and operating a wireless network with at least two communication units (at least a first and a second communication unit) and a further mobile communication unit. A method according to the invention for establishing and operating a wireless network with at least a first communication unit, a second communication unit and a mobile communication unit includes the following steps:

a) configuring the first communication unit and the second communication unit in each case as a server and configuring the mobile communication unit as a client, b) acquiring by the mobile communications unit connection set-up data of the first and second communication units, c) establishing a wireless connection from the mobile communication unit to the first communication unit, d) receiving by the first communication unit an instruction from the mobile communication unit via the wireless connection for configuration as a client of the second communication unit, for which purpose the mobile communication unit transfers the connection set-up data of the second communication unit to the first communication unit, and e) establishing a wireless connection from the mobile communication unit to the second communication unit.

The first communication unit and the second communication unit are typically components of larger mobile units, for example vehicles, that are intermittently interconnected. With the method according to the invention, it is possible to communicate via the mobile communication unit with both communication units simultaneously, although the first communication unit and the second communication unit are initially configured as servers and are therefore only electively accessible. The mobile communication unit sets up a client-server connection between the first communication unit as a client and the second communication unit as a server. To do this, the mobile communication unit transmits the connection set-up data of the second communication unit to the first communication unit and reconfigures the latter from server to client. To do this, the mobile communication unit transmits corresponding control commands to the first communication unit. The capability of the communication unit to be either a client or server is known, for example, from the mobile radio domain. Modern mobile telephones can thus be configured as either a WLAN client or a WLAN hotspot for mobile computers, i.e. for "tethering". In the method according to the invention, the first communication unit relinquishes its original server characteristic, switches off its own network and dials in as a client into the network of the second communication unit. The mobile communication unit can then access the first communication unit and the second communication unit in one and the same network (of the second communication unit).

In certain embodiments, following an interruption of the wireless connection between the first communication unit as a client and the second communication unit as a server, the first communication unit ends its status as a client and restarts as a server. It is thereby ensured that, in the event of a fault or in the case of intentional physical separation of the two communication units from one another, the first communication unit also re-establishes a network and is accessible to a client as a server.

In certain embodiments, the mobile communication unit, after acquiring the connection set-up data of the second communication unit, sets up a connection to the second communication unit. In particular, the connection set-up data, the activity and the status of the second communication unit as a server are intended to be verified before the first communication unit is accessed.

In these or other embodiments, the client-server connections may be WLAN connections according to the IEEE-802.11 standard, with the server as the access point. Already existing extensions of the standard, such as 802.11 b/g/n/ac and further extensions to follow in future are also already incorporated. The WLAN technology according to the standard is mature and the features and characteristics described above are available.

In specific embodiments, the client-server connections may also be Bluetooth connections, with the server as the master. The clients of the network then operate as "slaves" of the Bluetooth connections. Both communication units can be accessed with a network set up in this way also.

According to certain embodiments, the connection set-up data comprise an identifier of the associated communication unit and, in particular, also a password and/or encryption data. If possible, all data that are required in order to establish the wireless client-server connection should be made available as connection set-up data. When a WLAN connection is established, these data include, for example, a network identifier SSID, a network password and encryption data. Similar data are typically required for a Bluetooth connection.

In these or other embodiments, the connection set-up data of at least one of the first and second communication units are made available as an optically recognizable pattern and are read by the mobile communication unit, in particular as a QR code, data matrix code or as a barcode. The connection set-up data can thus be read by a camera or other optical recording device of the mobile communication unit and can be evaluated with corresponding software. A manual input of the data into the mobile communication unit is not required.

According to specific embodiments of the invention, the connection set-up data can be made available as data that are transmittable or retrievable via a radio link and can be read by the mobile communication unit, in particular for transmission via WPS, NFC, Bluetooth or RFID. The mobile communication unit then has corresponding technical ability for retrieving the connection set-up data. WPS is a known function for simplifying the set-up of WLAN connections. NFC is a wireless short-range transmission via a radio link. RFID relates to radio labels that are typically readable without dedicated power, i.e., in particular, are passively readable.

The invention also provides a method for establishing and operating a wireless network between vehicles and a mobile communication unit, wherein the first communication unit is allocated to a first vehicle unit and the second communication unit is allocated to a second vehicle unit. This means, in particular, vehicles that are to be intermittently interconnected, such as a traction unit and a trailer vehicle or a first trailer vehicle and a second trailer vehicle within a road train.

In view of the embodiments of this invention, it is possible for the first time to establish a wireless vehicle network in which at least two vehicles, on the one hand, and a mobile communication unit typically outside the vehicles, on the other hand, can communicate with one another. Through the client-server configuration, both vehicles can be accessed individually or jointly via the mobile communication unit. The vehicles can be controlled. Data can be retrieved from the vehicles.

The invention also provides a system for establishing and operating a wireless network, with at least a first communication unit to which connection set-up data are allocated, a second communication unit to which connection set-up data are allocated, and a mobile communication unit which has a function for reading connection set-up data. At least the first communication unit is operable as either a server or client in the network, wherein the second communication unit is operable at least as a server in the network, wherein the connection set-up data allocated to the first and second communication units are readable by the mobile communication unit, wherein, with the mobile communication unit as a client and with the connection set-up data of the first communication unit, a wireless connection can be established to the first communication unit as a server, wherein, with the mobile communication unit as a client and with the connection set-up data of the second communication unit, the first communication unit is reconfigurable as a client of the second communication unit operated as a server, and wherein, with the mobile communication unit as a client, a connection can be established to the second communication unit operated as a server. In this system, at least the first communication unit is operable as either the server or client in the network, and typically the second communication unit also. However, at least the second communication unit is intended to be provided as a server in the network. The terms "first" and "second" are selected arbitrarily and serve only to distinguish the first and second communication units in relation to the mobile communication unit.

According to embodiments of the invention, the first communication unit can be allocated to a first control unit of a first vehicle unit and the second communication unit can be allocated to a second control unit of a second vehicle unit. The system then describes a special vehicle network to which a mobile communication unit is additionally allocated as a client. The two vehicle units are typically a traction unit and a trailer vehicle. However, other vehicle types and vehicle type combinations can also be provided, including more than two vehicles.

According to embodiments of the invention, the mobile communication unit may be a portable computer. The mobile communication unit is typically a mobile telephone such as a Smartphone or tablet computer, both, in particular, having at least a WLAN function or Bluetooth function. These functions are already available as standard in Smartphones and tablet computers. In addition, suitable software is also provided which, for example, is offered by a provider of the system as an app for downloading (from the provider's website) and for installation. Software of this type can be programmed according to the aforementioned functions.

According to embodiments of the invention, the mobile communication unit may have a scanner or camera with software for evaluating images, in particular a function for reading QR codes, data matrix codes or barcodes. Smartphones and tablet computers are normally equipped with a camera. The Smartphone can perform the aforementioned tasks in conjunction with a software module for reading QR codes or other standardized, optically readable information.

The mobile communication unit is advantageously WLAN-enabled or Bluetooth-enabled. These characteristics are now also included in the standard equipment of a Smartphone.

The also invention also provides an electronic control unit for use in the system according to the invention, with a communication unit that is configurable as either a client or server for a wireless client-server connection. The control unit is typically provided with an interface for a data bus system, in particular for a CAN bus system. In the majority of cases, vehicles from European manufacturers have a CAN bus system for transmitting data and instructions within the vehicle. However, other data bus systems are also included. Modern commercial vehicles are equipped with a range of electronic control units and communicate with one another via the data bus system, for example an engine control unit and a braking control unit (of an electronic braking system). An electronic control unit with a communication unit, typically in a vehicle, is provided here.

The configuration can also be modified. The following steps are typically provided for this purpose:

a) the client-server connection from the first communication unit to the second communication unit is cleared down via the mobile communication unit, for example through an instruction to the client or server;

b) the first communication unit registers the cleardown of the connection, shuts down in a status without a client or server characteristic and restarts in a status with a server characteristic;

c) the second communication unit remains in its server mode;

d) the mobile communication unit then transfers the connection set-up data of the first communication unit to the second communication unit and causes the latter to shut down and restart as a client of the first communication unit; and e) the mobile communication unit makes contact as a client with the first communication unit as a server and can access the second communication unit (client) via the server.

The terms "first" communication unit and "second" communication unit are selected arbitrarily and are also interchangeable. For use in conjunction with vehicles, the first communication unit is intended to be a component of the first vehicle unit and the second communication unit a component of the second vehicle unit. The existence of further vehicle units is not thereby excluded. However, on completion of the configuration, only one vehicle unit is typically intended to have a communication unit operating as a server.

BRIEF DESCRIPTION OF THE DRAWINGS

The invention is described in greater detail below with reference to the accompanying drawing figures, in which:

FIG. 3 shows a flow diagram for modifying the configuration according to FIGS. 1 and 2.

DETAILED DESCRIPTION

Figure 2:
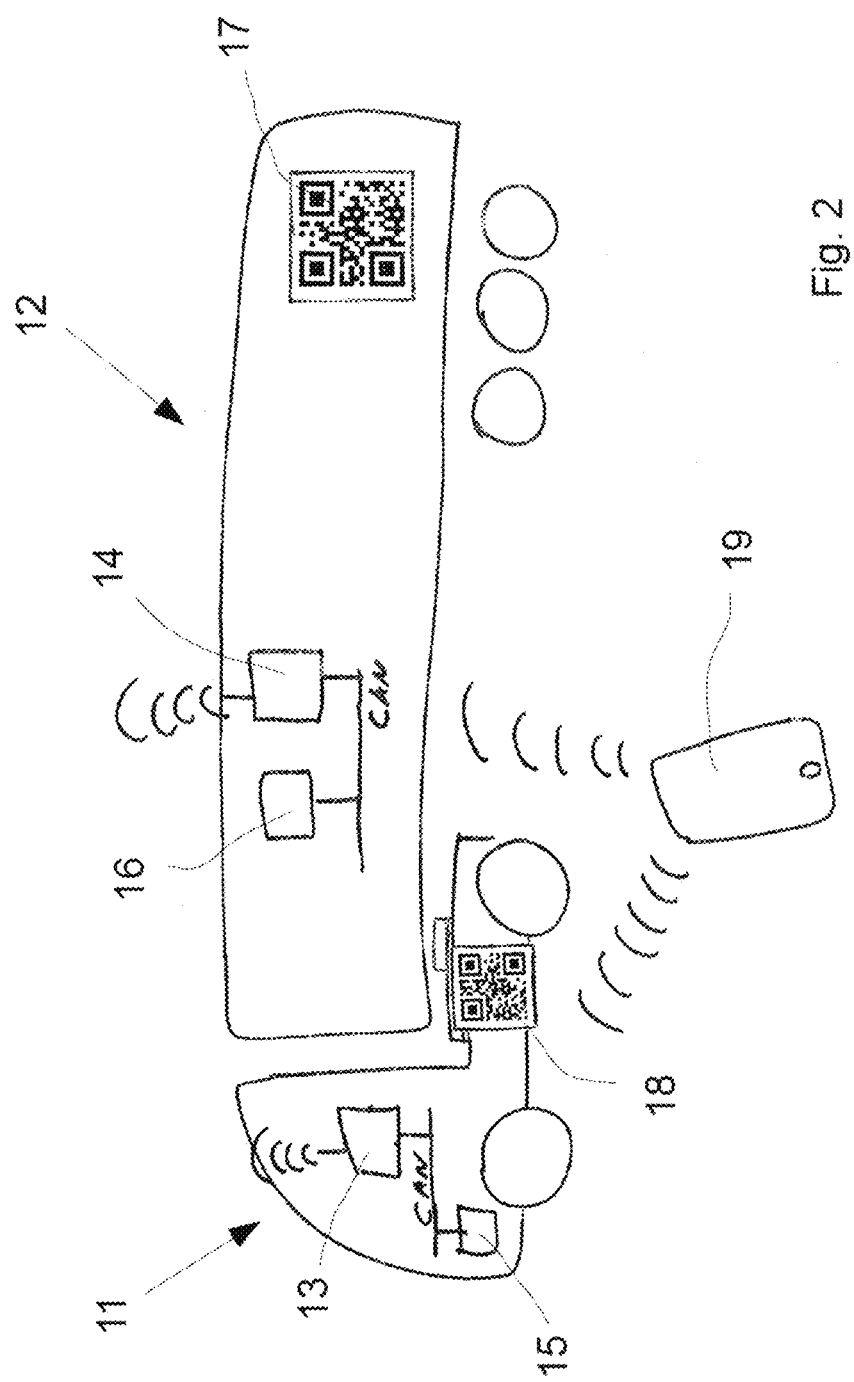
FIG. 2 shows the system according to FIG. 1 in conjunction with two vehicle units and with formation of a vehicle network.

In the example shown in FIG. 2, a road train consists of two vehicle units 11, 12. The first vehicle unit 11 is a traction unit and the second vehicle unit 12 is an articulated trailer. Both vehicle units 11, 12 are equipped with an electronic braking system and electronic control units to perform and control a wide variety of functions.

A control unit with a first communication unit 13 is provided in the first vehicle unit. Similarly, the second vehicle unit 12 has a control unit with a second communication unit 14. The control units are not shown separately in the drawing, but may be present in addition to the communication units 13, 14, or may be designed as integrated together with the latter.

In the present example, the communication units 13, 14 are transceivers for establishing and operating a WLAN connection. The control units allocated to the communication units are connected to an on-board CAN data bus system which may be connected in each case to further control units 15, 16.

Specific parameters are required to establish a WLAN connection. A WLAN client wishing to connect to a WLAN access point (server) requires the network identifier of the access point, information relating to the encryption and the password for this purpose. These parameters in relation to the second vehicle unit 12 are referred to as connection set-up data and are disposed here on the vehicle in optically readable form, e.g. as a QR code 17. Similarly, the connection set-up data for the first communication unit 13 are disposed on the first vehicle unit 11, e.g. as a QR code 18.

The locations for affixing the QR codes 17, 18 in FIG. 2 are selected arbitrarily. The QR codes may also be disposed elsewhere. Easy accessibility of the QR codes is appropriate in order to thus guarantee a high degree of user-friendliness. The QR codes are generally positioned in a concealed location to prevent misuse, for example behind a locked door or flap and/or are included with the vehicle documents.

An operating person is located with a mobile communication unit, i.e. a Smartphone 19 with a WLAN function, outside the vehicle units 11, 12. The vehicle units 11, 12 are stationary. The operating person wishes to retrieve data from both vehicle units 11, 12 and then remotely control functions of the vehicle units 11, 12 via the Smartphone 19. This involves, for example, the function of a pneumatic level control or the movement of a platform lift or the raising or lowering of a lift axle. Reciprocal access to different networks is to be avoided.

The establishing of a WLAN network with a server and a plurality of clients is required. The Smartphone 19 is configured as a client and is intended to access the communication units 13, 14 of the vehicle units 11, 12 in the aforementioned manner. The first and second communication units 13, 14 are preconfigured as servers (access points) and in each case established their own network.

Figure 1:
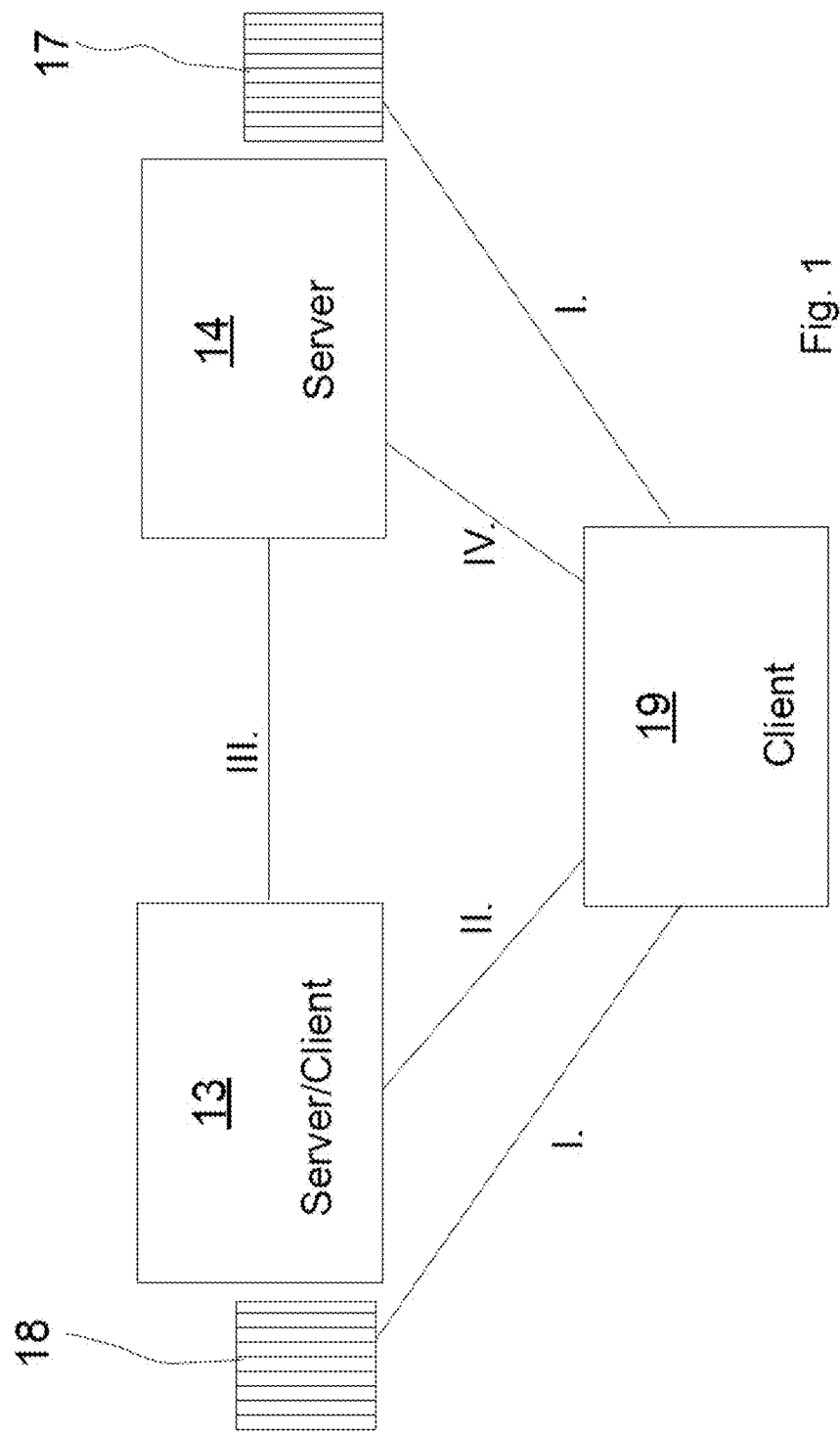
FIG. 1 shows a system with a first communication unit, a second communication unit and a mobile communication unit to form a wireless network.

In FIG. 1, the network is shown in a general form and/or, in order to simplify the representation, only with the communication units and the QR codes 17, 18.

In a first step, see I. of the digit sequences I., II., III. and IV. in FIG. 1, the operating person reads the two QR codes 17, 18 with the connection set-up data for both communication units 13, 14 with the Smartphone 19 via a camera with corresponding software.

In a second step (II. in FIG. 1), the Smartphone 19 as a client contacts the first communication unit 13 as the access point using the connection set-up data from the QR code 18 and also transmits the connection set-up data from the QR code 17. The Smartphone 19 simultaneously transmits control commands to the first communication unit 13 containing instructions for the first communication unit 13 to shut down in a basic mode without a server characteristic and then, in a third step (III. in FIG. 1), to log in as a client into the network of the second communication unit 14.

The Smartphone 19 is itself similarly a client in the wireless network of the second communication unit 14 and, in a fourth step (IV. in FIG. 1), can also access the communication unit 13 and the data of the vehicle units 11, 12 via the communication unit 14. The Smartphone 19 maintains a connection to one server only, i.e. to the second communication unit 14. Depending on the functionality of the allocated control units (and their software) and the software installed on the Smartphone 19, functions of both vehicle units 11, 12 can also be controlled by the Smartphone 19.

Traction vehicles and trailer vehicles may be separated from one another or may be exchanged. Two or more trailer vehicles may also be coupled to one another. It may therefore be appropriate to modify a defined configuration of a communication unit as a server and reconfigure this communication unit as a client. Accordingly, a different communication unit then performs the server function. This is explained on the basis of the example shown in FIG. 2 and in conjunction with FIG. 3.

On the basis of the configuration presented above, the aim is to configure the first communication unit 13 in the traction unit as a server and the second communication unit 14 in the trailer vehicle as a client. The Smartphone 19 and the first communication unit 13 are clients in the network of the second communication unit 14. The Smartphone 19 transmits control commands via the network to the first communication unit 13. The control commands cause the first communication unit 13 to end its status as a client or shut down in a basic mode with no status and then restart in the predefined default status as a server. The first and second communication units 13, 14 are then both servers once more.

In a further step, the Smartphone 19 transmits control commands to the second communication unit 14 so that the latter shuts down in a basic mode with no status and restarts as a client of the first communication unit 13. To do this, the Smartphone 19 forwards the connection set-up data of the first communication unit 13 to the second communication unit 14.

The Smartphone 19 then dials in as a client into the network of the first communication unit 13.

In the present example, the traction unit is selected purely arbitrarily as the first vehicle unit 11. The order may also be reversed, with the traction unit as the second vehicle unit and with a second communication unit.

Instead of WLAN radio technology, a different wireless transmission technology can also be used, insofar as this enables a client-server operation, for example the known Bluetooth radio technology with a master as a server and slaves as clients. The same applies to other wireless transmission technologies.

What is claimed is:

1. A method for establishing and operating a wireless network, the method comprising:
   providing a first communication unit associated with a first vehicle, a second communication unit associated with a second vehicle, and a mobile communication unit,
   configuring the first communication unit and the second communication unit in each case as a server and configuring the mobile communication unit as a client,
   optically acquiring by the mobile communications unit connection set-up data of the first and second communication units,
   establishing a wireless connection from the mobile communication unit to the first communication unit such that the mobile communication unit is a client of the first communication unit,
   receiving by the first communication unit an instruction from the mobile communication unit via the wireless connection for configuration of the first communication unit as a client of the second communication unit and transferring by the mobile communication unit the connection set-up data of the second communication unit to the first communication unit, and
   establishing a wireless connection from the mobile communication unit to the second communication unit.

2. The method as claimed in claim 1, wherein, following an interruption of the wireless connection between the first communication unit as a client and the second communication unit as a server, the first communication unit-ends its status as a client and restarts as a server.

3. The method as claimed in claim 1, wherein the mobile communication unit, after acquiring the connection set-up data of the second communication unit, establishes a connection to the second communication unit to verify the connection set-up data, an activity and a status of the second communication unit as a server.

4. The method as claimed in claim 1, wherein the client-server connections are WLAN connections according to the IEEE-802.11 standard, with the server as an access point.

5. The method as claimed in claim 1, wherein the client-server connections are Bluetooth connections, with the server as a master.

6. The method as claimed in claim 1, wherein the connection set-up data comprise an identifier of the associated first or second communication unit.

7. The method as claimed in claim 1, wherein the connection set-up data of at least one of the first and second communication units are made available as an optically recognizable pattern and are read by the mobile communication unit.

8. The method as claimed in claim 1, wherein the connection set-up data can be made available as data that are transmittable or retrievable via a radio link and readable by the mobile communication unit.

9. A system for establishing and operating a wireless network, comprising:
   a first communication unit to which connection set-up data are allocated, the first communications unit being associated with a first vehicle,
   a second communication unit to which connection set-up data are allocated, the second communications unit being associated with a second vehicle, and
   a mobile communication unit for optically reading connection set-up data,
   wherein at least the first communication unit is operable as either a server or client in the wireless network,
   wherein the second communication unit is operable at least as a server in the wireless network,
   wherein the connection set-up data allocated to the first and second communication units are optically readable by the mobile communication unit,
   wherein, with the mobile communication unit as a client and with the connection set-up data of the first communication unit, a wireless connection can be established to the first communication unit as a server, wherein, with the mobile communication unit as a client and with the connection set-up data of the second communication unit, the first communication unit is reconfigurable as a client of the second communication unit operated as a server, and wherein, with the mobile communication unit as a client, a connection can be established to the second communication unit operated as a server.

10. The system as claimed in claim 9 wherein the mobile communication unit is a portable computer.

11. The system as claimed in claim 9, wherein the mobile communication unit has a scanner or camera with software for evaluating images.

12. The system as claimed in claim 9, wherein the mobile communication unit is WLAN-enabled or Bluetooth-enabled.

13. An electronic control unit for the system as claimed in claim 9, with a communication unit which is configurable as either a client or server for a wireless client-server connection.

14. The control unit as claimed in claim 13, including an interface for a CAN bus system.

15. The method as claimed in claim 6 wherein the connection set-up data also comprises a password and/or encryption data.

16. The method as claimed in claim 7 wherein the optically recognizable pattern is a QR code, data matrix code or a barcode.

17. The method as claimed in claim 8 wherein the radio link is defined as WPS, NFC, Bluetooth or RFID.

18. The system as claimed in claim 11 wherein the images are QR codes, data matrix codes or barcodes.

* * * * *